PHOTO REPRODUCTION SIZE VARIATION

Filed Sept. 16, 1965

INVENTOR.
DEREK JOHN KYTE

United States Patent Office 3,422,216

Patented Jan. 14, 1969

3,422,216

PHOTO REPRODUCTION SIZE VARIATION

Derek John Kyte, 117 Valley Road, Chorleywood, Hertfordshire, England

Filed Sept. 16, 1965, Ser. No. 487,884
Claims priority, application Great Britain, Sept. 23, 1964, 38,782/64
U.S. Cl. 178—5.2 10 Claims
Int. Cl. H04n *1/46;* H04n *9/00*

ABSTRACT OF THE DISCLOSURE

A rotating drum carries the negative which is to be exposed by a light beam movable relative to the drum. Signals are produced which are a function of the speed of the rotation of the drum and these signals are used to form a raster for the light spot of a cathode ray tube which illuminates the transparency to be reproduced. The transparency so illuminated produces signals in photo-electric tubes which signals are then used to control the illumination of the light source that is exposing the negative. By changing the size of the raster produced by the signals picked off from the rotating drum or by changing the optics through which the cathode ray tube illuminates the transparency, the size of the picture produced on the negative may be varied with respect to the size of the picture as shown by the transparency.

This invention relates to electronic apparatus for the production of color or monochrome separations from a transparent original.

Such devices are well known in the art. One common form consists of two or more mechanically-coupled rotating cylinders, one of which is transparent and carries the original transparency, while at least one other carries a sheet of unexposed film. A light beam is projected through the transparent drum and the transparency wrapped around it, after which the beam passes through a suitable optical system and falls on one or more photo-electric cells. Where the original is colored, it is usual to split the transmitted beam into a plurality of components, each of which consists of light of a certain band of wavelengths. For example, such splitting may be achieved with a prism or with color filters. The different beams fall on different photo-electric cells from which are obtained a plurality of electrical signals representing the color of the particular part of the original transparency through which the scanning beam passes.

The signals generated by the photo-electric cells are passed into electronic circuits performing functions well known in the art. For example, in monochrome scanning the electronic circuits will perform some form of contrast alteration, tonal correction, and unsharp masking. In color scanning, there will in general be circuits for performing additionally the processes known as color correction (masking), the separation of a black component, and under-color removal.

Considering one such circuit, its output is an electrical signal representing a corresponding function of the transmission properties of the original transparency at the point being scanned. The output is directed to a corresponding device (glow tube for example) for producing light of varying intensity according to the applied electrical signal. The emitted light is focussed onto a small area of the unexposed film carried on the corresponding drum.

During scanning, the drums rotate in synchronism, while the scanning and exposing units are moved axially in synchronism. The point of impact of each beam on its respective drum thus describes a closely-spaced series of lines in the form of a helix and gradually covers the surface area of the drum. The exposed films, after suitable processing, have optical densities which represent positive or negative records of the original transparency. They may, for example, be four in number and represent respectively the yellow, cyan, magenta and black contents of the original. From these films, by further well known processes, printing plates may be made which can be inked with yellow, magenta, cyan and black inks and used to print superimposed images to produce a printed reproduction of the original transparency. Alternatively, a single film may be produced which may be used to prepare a printing plate to print a monochrome reproduction of the original transparency.

It is not necessary to have four exposing drums, even for multi-color work. A single exposing drum can be used and the four records exposed one after the other, the control systems being suitably switched between each scan to give the required separation record.

Other machines are known in which the original transparency and the films to be exposed are held flat on a reciprocating bed or series of beds, the other principles being similar to those described above. Yet other machines are known which use a cathode ray tube to produce a spot of light for scanning purposes. The original transparency is either held close to the face of the tube or has focussed onto it by optical means an image of the tube face. The light spot is moved across the face by well known electronic methods to produce a raster which covers the area of the original transparency either directly or via said optical focussing means. In the absence of changes in light spot intensity, the camera produces a normal uncorrected color separation. To do this, it is necessary to interpose a red, blue or green filter in the light path to the film so that a cyan, yellow or magenta uncorrected separation is produced. To produce a *corrected* separation, the light spot has to change its intensity when traversing certain colored areas of the original. To know when to change the intensity, the computer has to be fed with information about the color of the particular part of the original being scanned. Thus part of the emergent light is split off, divided into three colored beams and directed to three photo-cells. A part of the light transmitted by the transparency is split off (by a partly reflecting mirror, for example) and directed by suitable optical means to one or more photo-multipliers. It is usual to have three such multipliers, the light beam to each being passed through, for example, red, green and blue filters. The remainder of the light transmitted by the transparency is collected by a lens so positioned that an image of the transparency is focussed onto an unexposed film. Means are provided for placing various color filters in the path of the light collected by the aforesaid lens. If the filter used is green, for example, and if the light spot on the cathode ray tube face remains of constant brightness for the whole of the scanning period, then the apparatus behaves as a camera with constant light source. In the above case a so-called uncorrected magenta separation negative would be produced. However, by feeding the signals from the photo-multipliers to suitable electronic circuits, and by causing the output signals of such circuits to modulate the brightness of the spot on the cathode ray tube, it is possible to modify the recorded image. The purpose of such modification is to reduce the apparent contrast range of the original, to apply electronic color masking, under-color removal, etc. The chief advantage of this type of scanner is that it is very simple to alter the relative positions of the lens and film so that records larger or smaller than the original can be produced. A disadvantage is that high quality cathode ray tubes with very small light spots are not currently available in large sizes, thereby limiting the size of original which can be scanned. Although it is possible to enlarge the raster optically before focussing onto the transparency, such enlargement increases the effective size of the light spot and may cause too much degradation of the modified details in the recorded separation.

The light intensity and brightness range available with current cathode ray tubes also impose limitations on the range of corrections or modification of the original which such scanners can achieve. For example, they could not produce positive separations from positive originals—a very common requirement in the printing industry.

Rotating drum scanners do not suffer from such difficulties. They can be designed to scan very large originals with a high degree of detail resolution. However, it is difficult to produce enlarged or reduced records of the original with such scanners. It is true that scanning drums of different diameters could be provided, and that the scanning and exposing optics could be moved at different speeds relative to the scanning and exposing drums. Such methods, however, are clumsy and expensive and do not allow the enlargement or reduction factor to be adjusted quickly.

The majority of the scanners available produce photographic separations which are continuous tone. For the production of printing plates, however, it is normally necessary to "screen" these separations. By screening is meant the photographic process in which the image is broken up into a large number of dots of size, and sometimes optical density, related to the optical density of the corresponding areas of the continuous tone positive or negative. In this process of screening, which is often carried out in a camera, it is quite possible to enlarge or reduce the image. However, when screening scanned separations, there is a limit to the degree of enlargement which may be employed. This is because a scanned separation is made up of a number of parallel lines, which although just touching, are always visible as such under optical magnification. If the number of such lines per inch approaches the screen period, then unpleasant moire patterns can appear when attempts are made to produce screen separations. In practice, with a separation scanned at 500 lines per inch, and a screen of 133 per inch, enlargement is not satisfactory above about 3 times.

Where it is desired to reproduce from transparencies with an overall enlargement factor greater than about 3, therefore, a proportion of the enlargement must be produced at the scanning stage and scanners which cannot enlarge are of little use.

It is the purpose of the present invention to overcome this problem by providing means whereby a rotating drum reproducer may be enabled to enlarge or reduce from transparencies as well as reproducing them same size. The invention consists basically of a cathode ray tube scanning device for scanning a transparency in combination with conventional means for reproducing by exposing film on a rotating drum, the movement of the light spot on the face of the cathode ray tube being electronically synchronized with the rotational movement of the drum, while the ratio of the height of the raster of the CRT and the height of the effective reproducing sweep on the drum is variable.

The invention will now be described with reference to the attached drawings of which FIG. 1 shows diagrammatically one embodiment of the invention.

FIG. 3 shows a fixed aperture plate for association with the disc shown in FIG. 2, while

Figure 1:
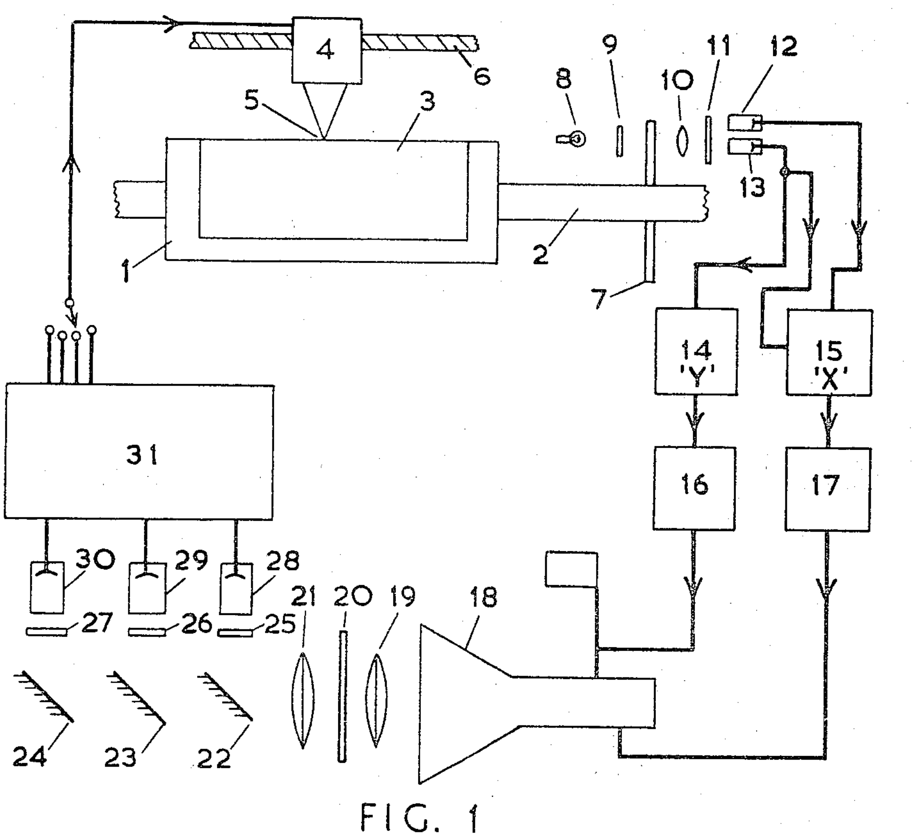

Referring to FIG. 1, the drum 1 is carried on a shaft 2 which is rotated at constant speed by a suitable driving means (not shown). A film 3 is wrapped round the drum and exposed in a series of adjacent parallel lines by a light spot 5 produced from the optical system and a modulatable light source 4. The latter is driven axially by a lead screw 6 which rotates at constant speed and which may for convenience be driven via gears or belts from the drum shaft 2. Alternatively, the optical system and light source 4 may be stationary and the rotating drum 1 moved axially as it rotates. Other arrangements are possible, it being of no importance to this invention how the light spot is moved relative to the film on the rotating drum. Moreover, the invention is applicable whether one or several exposing drums are used. For the purpose of synchronisation, described in more detail below, it is necessary to generate electrical pulses in synchronism with the rotation of the drum. In the preferred embodiment of the invention, this is achieved by mounting on the drum shaft a transparent disc 7 having timing marks on two concentric tracks.

Figure 2:
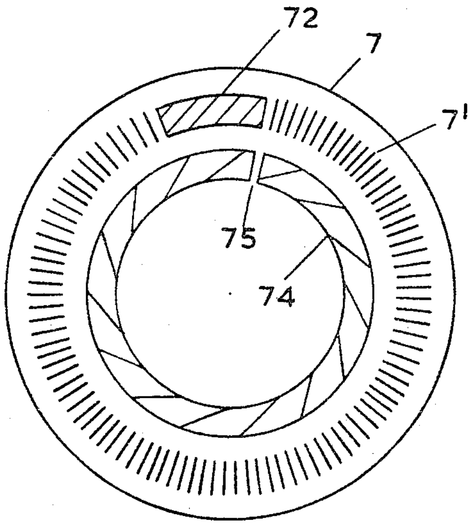
FIG. 2 shows one form of timing disc which may be attached to the shaft of the exposing drum.

FIG. 2 shows disc 7 in more detail. The outer track contains a circular array of equally-spaced opaque radial lines 71 over approximately 90% of its length, the remaining 10% being opaque and shown by cross hatching 72. The disc is so disposed with respect to the rotating drum that this opaque region coincides in angular position with that part of the drum containing the clips or other means for holding the ends of the film.

The total number of lines 71 is not critical, providing it is high enough. In practice, 250 lines per inch of track is found satisfactory for a disc of 5" diameter. The inner track is opaque for almost all its length, as indicated by cross-hatching 74, leaving a single transparent radial slit 75 approximately .005" wide. This slit is positioned so that it is near the right hand edge of the opaque part of the outer track for clockwise rotation of this disc.

Figure 3:
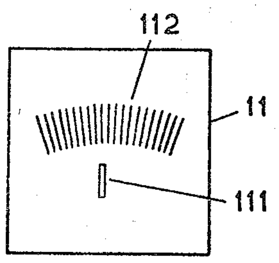

Referring again to FIG. 1, a light source 8 throws a radial strip of light onto disc 7 via a cylindrical lens 9, the light strip being so disposed that it illuminates a part of the disc through which pass both concentric timing tracks. On the other side of the disc a further lens 10 produces an imagine of the illuminated part of the disc on a fixed aperature plate 11 shown in front elevation in FIG. 3. Plate 11 is opaque execpt for a single lower transparent slit 111 corresponding in size to the slit 75 on the inner track of the timing disc and optically in line therewith and an upper group of several transparent lines 112 forming a segment of a circular track corresponding to and optically in line with the outer track of the timing disc 7. Once per revolution of the timing disc 7, the image of the slit 75 formed by lens 10 on the aperture plate 11 coincides with slit 111. Similarly, the images of the lines 71 in the outer track of the timing disc 7 coincide with the lines 112 on the aperture plate 11 as many times per revolution as there are lines round the disc. The light passing through the outer tracks on disc 7 and plate 11 is picked up by photocell 12 while that passing through the slits 75, 111, is picked up by photocell 13.

The electrical pulses from the photocells 12, 13 are respectively passed into corresponding circuits 14, 15 which amplify them, shape them and limit them. A start control connection is also provided from the photocell 13 to the circuit 15. The outputs of circuits 14, 15 are pulses of the same frequency as the photocell signals but of constant duration and height. The outputs from 14 and 15 are next fed to "staircase" function generators 16, 17 which produce stepped outputs, the outputs being stepped currents for magnetic deflection or stepped voltages for electrostatic deflection of the cathode ray tube 18 to which generators 16, 17 are connected.

The staircase function derived from the photocell 12 looking at the outer track of the timing disc 7 is used to deflect the light spot on the cathode ray tube 18 in one direction (the X direction) while the staircase function derived from the photocell 13 looking at the inner track deflects the spot in a direction at right angles to this (the Y direction).

Before the scanning process starts, the flying spot of CRT 18 is statically deflected by independent circuits (not shown) to the bottom left hand corner of its screen. At this time, the output of both staircase generators is zero, the rotating drum is stationary, and the scanning light spot 5 is at the starting end of the drum. When the start signal is given, the X staircase generator does nothing until the slits 75, 111 pass in front of the light strip from lamp 8 and a first "commencement of cycle" signal is generated by photocell 13 and passed to both circuits 14, 15. Shaping circuit 15 now begins to respond to the pulses from the gratings 71, 112 so that generator 17, as well as generator 16, starts to generate a staircase, the steps being at the frequency determined by the rate at which the lines on the outer track of the timing disc pass photocell 11. The CRT flying spot thus moves across its screen in synchronism with the rotation of the drum. When the timing disc 7 has rotated so that the opaque portion 72 of the outer track reaches photocell12, photocell 13 receives another pulse via 75, 111. This pulse causes the output of the X staircase generator 15 to drop to zero and at the same time causes the output of the Y generator 14 to increase by one step. Thus the light spot moves rapidly back to its starting position and virtually simultaneously moves vertically by a small distance to the next raster line. On further rotation of the timing disc 7, pulses are again received by the X generator from photocell 11 and the whole process is repeated. In this way, the raster on the cathode ray tube is produced in synchronism with the movement of the rotating exposure drum and the exposure light source. It is, of course, necessary that the heights of the pulses driving the two staircase generators are accurately adjusted relative to one another in order that the ratio of the horizontal to vertical deflection is the same as that between the drum peripheral speed and the axial speed of the exposure light source.

It is not necessary for the realisation of the invention that the synchronization is achieved by using a transparent timing disc. A disc coated on its face or rim with magnetic material, on which magnetic timing pulses have been previously recorded, may also be used in conjunction with a suitable reading head. Phonic wheels may also be used or even electrical contacts operated by cams. Moreover, it is not essential to use staircase generators to deflect the spot on the cathode ray tube. Linear saw tooth generators may be used if desired, in which case only one timing pulse per drum revolution; e.g. from the inner track only, Fig. 2; is required for synchronization purpose.

Referring once more to FIG. 1, an image of the raster on the face of the cathode ray tube 17 is focussed onto a color transparency 20 by means of a lens 19. A part of the light transmitted by the transparency is collected by lens 21 and passed to a triple beam splitter consisting of partly reflecting mirrors 22, 23 and wholly reflecting mirror 24. The three beams produced by these mirrors fall on the photocells 28, 29, 30 after passing through color filters 25, 26, 27. It is possible to use other types of beam splitter incorporating, for example, dichroic mirrors, prisms, etc. The electrical signals from the three photocells are fed to a computer 31 performing the various functions referred to earlier. The outputs of the computer, which are normally four in number, are switched in turn to the exposing means 4 or are fed simultaneously to four such exposing means.

The enlargement factor produced by the system depends on the ratio between the peripheral speed of the exposing drum and the speed of the image of the light spot produced on the transparency 20. If this light spot moves, for example, 2" in one tenth of a second, while the outer surface of the drum moves 10" in the same interval, then an enlargement of five times is obtained. To obtain different degrees of enlargement and of reduction, it is necessary to alter the size of the raster on the face of the tube by, for example, altering the amplitude of the output steps of the two staircase function generators 16, 17; or to change lens 19 for another of different focal length; or to change the relative positions of lens 19 and cathode ray tube 18. The latter method is preferred in practice.

Figure 4:
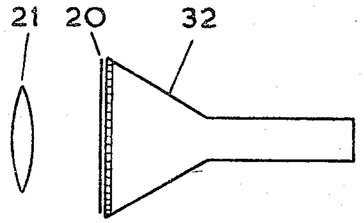
FIG. 4 shows the use of a cathode ray tube with a fibre optic screen in the scanning system of FIG. 1.

In FIG. 4, an alternative embodiment of the invention is shown in part. The cathode ray tube 32 has a fibre optic face plate. This enables the lens 19 to be dispensed with and the transparency 20 is mounted in contact with the face of the tube. The remainder of the apparatus is as shown in FIG. 1. With this system, a change in the enlargement factor is produced by altering the size of the raster on the cathode ray tube, as explained above.

What I claim is:

1. Photographic reproduction equipment comprising light-spot raster scanning means for an original and light spot raster reproduction means synchronized with said scanning means, wherein one of said means comprises light-spot generating and coordinately-moving means and the other of said means comprises a rotatable drum which is also axially movable relative to a light-beam source, and comprising electrical time-pulse generating means controlled by the drum for controlling the coordinate movements of said light-spot generating and coordinately-moving means, and comprising means for varying the size ratio between both coordinates of the two rasters respectively on the original and the reproduction.

2. Photographic reproduction equipment as claimed in claim 1 wherein said electrical time pulse generating means is arranged to generate a time pulse train throughout the effective scanning portion of each drum rotation and a separate single pulse per drum revolution at the commencement of each of said pulse trains, and which comprises two staircase function generators one of which commences operation in response to one of said single pulse and is thereafter stepped in response to each pulse of each of said pulse trains being returned to zero in response to each succeeding single separate pulse of a sequence of single pulses and wherein said size-ratio varying means comprises means for altering the amplitude of the output steps of said staircase function generators.

3. Photographic reproduction equipment as claimed in claim 1 wherein said electrical time pulse generating means generates a single pulse per drum revolution, and which comprises linear sawtooth generators controlled by said pulses for generating raster line control signals and wherein said size-ratio varying means comprises means for altering the amplitude of the output steps of said sawtooth generators.

4. Photographic reproduction equipment as claimed in claim 1 which comprises mounting means for a transparent original in front of the light-spot generating and coordinately-moving means, beam-splitting means beyond said mounting for directing splits from the beam from the light-spot via light filters to light-responsive devices, a computing device to which the outputs of said light-responsive devices are connected, and the output of which applies an electrical reproduction signal train to a light source, and means for relatively moving said light source and drum along the axis of said drum in such manner with respect to rotation of the drum that the light-beam from said light source and a light-sensitive sheet wrapped around the drum will move relatively raster-fashion.

5. Photographic reproduction equipment as claimed in claim 4 comprising lens systems between said light-spot generating and coordinately-moving means and said mounting means and between said mounting means and said beam-splitting means.

6. Photographic reproduction equipment as claimed in claim 5 and wherein said size-ratio varying means comprises means for modifying the lens system between said light-spot generating and coordinately-moving means and said mounting means.

7. Photographic reproduction equipment as claimed in claim 6 wherein said modifying means is arranged to adjust the setting of said lens system.

8. Photographic reproduction equipment as claimed in claim 6 wherein said modifying means provides for replacing a lens.

9. Photographic reproduction equipment comprising light-spot generating and coordinately-moving means for scanning a transparent original and a rotatable drum reproducer which is also axially movable relative to a light-beam source; electrical time pulse generating means controlled by the drum for controlling the coordinate movements of said light-spot generating and coordinately-moving means, and means for varying the size ratio between both coordinates of the two rasters respectively on the original and the reproduction.

10. Photographic reproduction equipment as claimed in claim 9 wherein said electrical time pulse generating means is arranged to generate a time pulse train throughout the effective scanning portion of each drum rotation and a separate single pulse per drum revoltion at the commencement of each of said pulse trains, and which comprises two staircase function generators one of which commences operation in response to one of said single pulses and is thereafter stepped in response to each pulse of each of said time pulses trains being returned to zero in response to each succeeding single separate pulse of a sequence of single pulses and wherein said size-ratio varying means comprises means for altering the amplitude of the output steps of said staircase function generators.

References Cited

UNITED STATES PATENTS

| | | | |
|---|---|---|---|
| 2,171,537 | 9/1939 | Bingley | 178—69.5 |
| 3,012,093 | 12/1961 | Taudt | 178—5.2 |
| 3,134,849 | 5/1964 | Frohbach et al. | 178—5.2 |
| 3,299,434 | 1/1967 | McNaney | 178—6 |

ROBERT L. GRIFFIN, *Primary Examiner.*

RICHARD MURRAY, *Assistant Examiner.*

U.S. Cl. X.R.

178—6